Sept. 2, 1941. L. M. CASTLE 2,254,419
SAFETY LOCK FOR AUTOMOBILE DOORS
Filed May 1, 1940
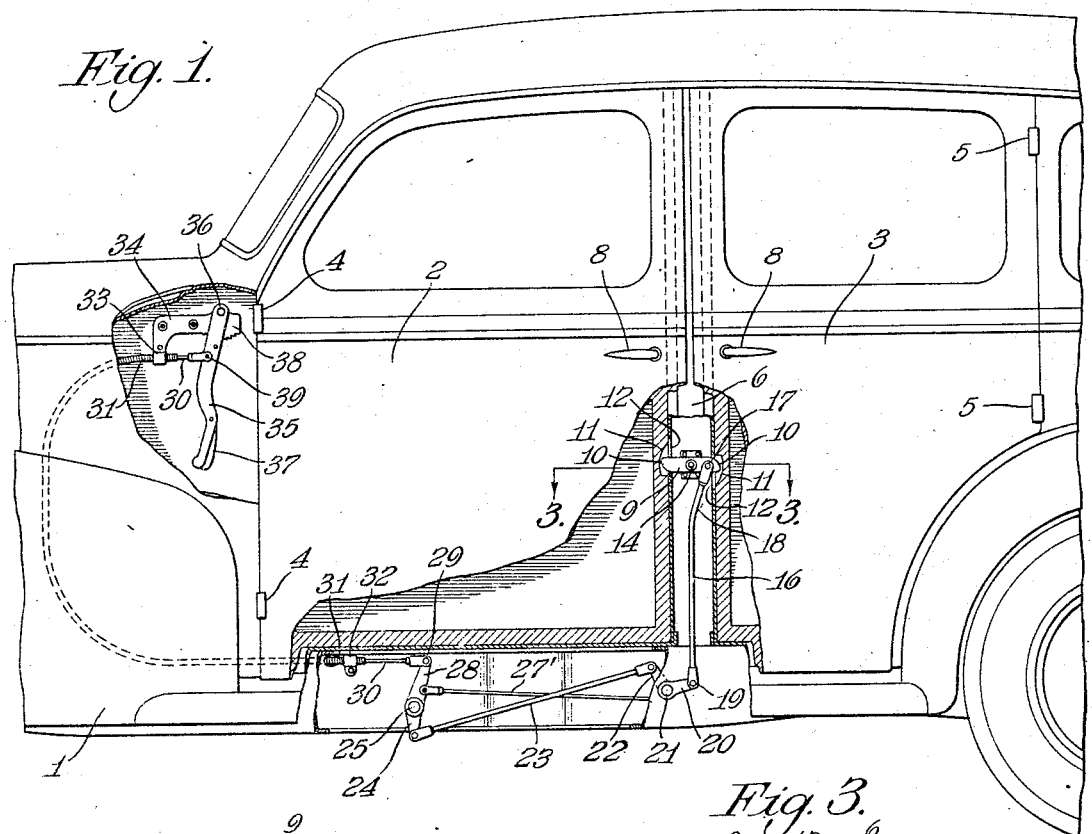
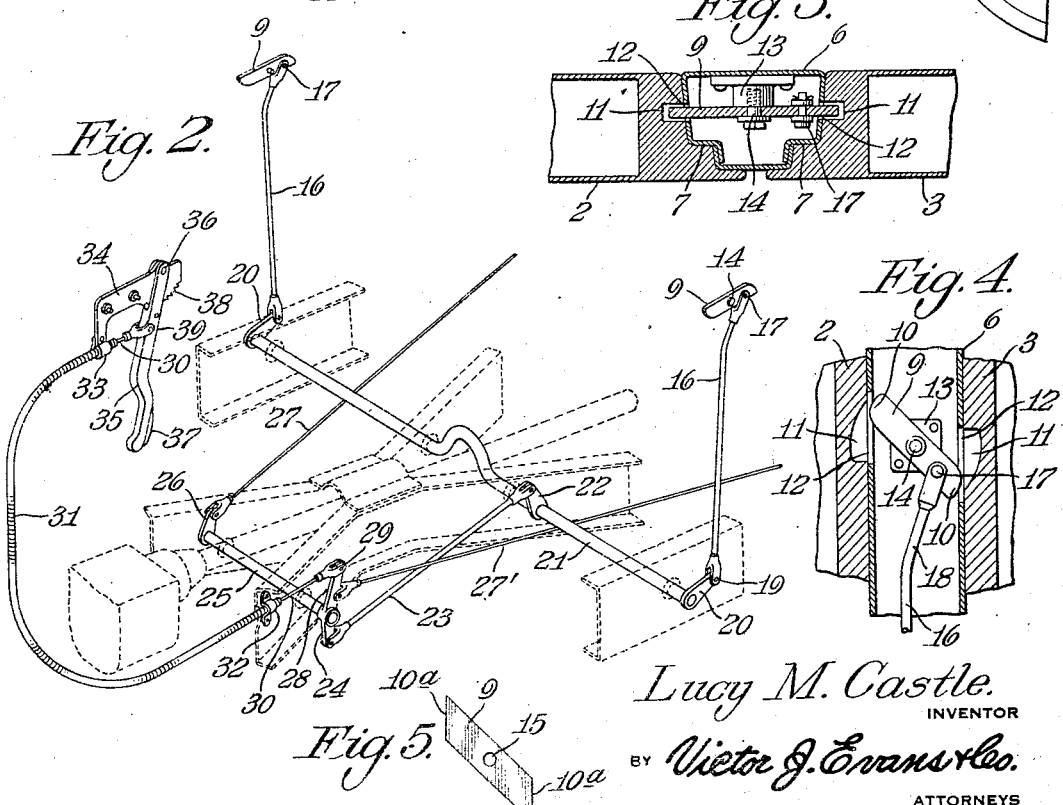
Lucy M. Castle,
INVENTOR
BY Victor J. Evans & Co.
ATTORNEYS Patented Sept. 2, 1941

2,254,419

UNITED STATES PATENT OFFICE 2,254,419

SAFETY LOCK FOR AUTOMOBILE DOORS

Lucy M. Castle, Akron, Ohio

Application May 1, 1940, Serial No. 332,815

3 Claims. (Cl. 180—82)

This invention relates to safety locks for the doors of automobiles and the like and has for its prime object to provide for the locking of all the doors of the vehicle and maintaining them locked while the vehicle is in operation and also when brought to a stop at crossings, street intersections, stop lights and other occasions by the application of the brakes in the operation of the regular brake actuating means in the ordinary driving control of the vehicle.

A particular object is to associate and connect the safety locking mechanism with the emergency brake mechanism so that when the emergency brake controlling and actuating element is released to put the vehicle in operation the safety locks are simultaneously closed and when the emergency brake is set to stop the vehicle and hold it at a standstill the safety locks are simultaneously opened.

A further object is to simplify the operating mechanism whereby to be readily installed on an automobile or the like and to provide a locking element of simple yet strong and durable construction to function in common with a pair of companion doors to lock both of them at the same time and likewise release the lock at the will of the operator.

With the foregoing and other objects and advantages to be attained, the invention consists in the novel general construction and arrangement and in the particular parts and combinations and arrangements of parts as hereinafter described and defined in the appended claims, reference being had to the accompanying drawing illustrating a practical adaptation of the invention, in which—

Figure 1 is a view partly in side elevation and partly in vertical section of an automobile body showing the safety lock applied in locking relation to the doors of the vehicle;

Figure 2 is a perspective schematic view of the assembly of the lock operating and controlling mechanism shown in full lines with parts of the vehicle frame shown in dotted lines to illustrate a practical mounting of the mechanism on the vehicle;

Figure 3 is a fragmentary section on an enlarged scale, taken on or about the line 3—3 of Figure 1 and showing the safety lock in closed position;

Figure 4 is a fragmentary view partly in vertical section and partly in elevation illustrating the safety lock in opened position; and Figure 5 is a detail view of a modified form of locking element.

Referring now to the drawing in detail, the numeral 1 designates, in general, the body of an automobile having companion doors 2 and 3 which are hingedly mounted, as at 4 and 5, respectively, and closed against a common pillar 6 therebetween. The pillar 6 may be of any conventional structure, but, as shown, is hollow and made of sheet metal and having the usual rabbeted portions 7 (see Figure 3) against which the counterpart portions of the doors 2 and 3 abut when closed.

It is here noted that, in addition to the safety locks of the present invention, the doors 2 and 3 are provided with the regular equipment of ordinary and separate locks (not shown) which are provided with the usual outside operating handles 8 as illustrated conventionally in Figure 1.

The safety lock of the present invention comprises a locking element proper 9 which is a flat bar in the form of a parallelogram, that is to say, it is elongated with two parallel longitudinal sides and parallel slanting end portions, which latter may be either rounded, as shown at 10 in Figures 1 and 4 of the drawing, or beveled, as at 10ª in the modification illustrated in Figure 5. In either case, the end portions of the locking element 9, in the closed position of the element, enter recessed keeper portions 11 of the doors 2 and 3 through registered slots 12 provided therefor in the adjacent wall portions of the hollow sheet metal pillar 6. As shown, the locking element 9 is pivotally mounted on a supporting bracket 13 comprising a rectangular base portion which is riveted or otherwise securely fastened to the inner face of the adjacent wall portion of the pillar 6, there being a central boss on the base portion of the bracket and provided with a screw-threaded axial bore for the reception of a headed pivot stud 14 which is inserted through a central bearing aperture 15 in the locking element 9.

As hereinabove stated, in the closed position of the locking element 9, which position is horizontal and transversely of the pillar 6, the inclined end portions 10 or 10ª, as the case may be, of the locking element are entered within the recessed keeper portions 11 of the doors 2 and 3, but when the locking element is turned from its locking position, through approximately an angle of forty-five degrees, as shown in Figure 4, the end portions of the element are entirely clear of the recessed keeper portions 11 of the doors.

For the control and operation of the locking element 9, an actuator rod 16 is pivotally attached at one end to the locking element 9, at one side of the pivot stud 14, as at 17, the major portion of the rod 16 extending vertically downward and medially within the pillar 6 with its upper end portion 18 inclined to the point of pivotal attachment to the locking element 9.

The lower end portion of the actuator rod 16 is projected below the lower end of the pillar 6 and pivotally attached, as at 19, to a crank arm 20, which latter is fixedly secured to the end of a rockshaft 21 journaled in and extending transversely of the underframe members of the vehicle. In this connection, it is noted that a duplicate crank arm 20 is provided at the opposite end of the rockshaft 21 and connected by like instrumentalities to the locking element 9 which operates in association with the companion doors at that side of the vehicle body, by which provision and arrangement the doors at both sides of the vehicle body are simultaneously locked and unlocked by the actuation of a common operating means to be now described.

As shown, the rockshaft 21 is provided with an actuator arm 22 which is connected by a pitman rod 23 to the lower arm 24 of a lever element fixed on one end of a transverse rockshaft 25 which is journaled in the adjacent underframe portion of the vehicle and carries at its opposite end a crank arm 26, which latter is connected by the conventional cable 27 to the operating mechanism (not shown) for one of the emergency brakes, also not shown, but obviously provided for the rear ground wheels of the vehicle. The operating mechanism for the opposite emergency brake is likewise connected by a cable 27' to the parallel upper arm 28 of the lever element whose lower arm 24 is connected by the pitman rod 23 to the actuator arm 22 as just above described.

The upper arm 28 of the lever element on the rockshaft 25 is pivotally attached at its upper end, as at 29, to the end of a flexible rod or stout wire 30 which is extended through and slidable in a guide tube 31 whose lower end portion is supported by a bracket 32 secured to an adjacent portion of the underframing of the vehicle, the upper end portion of the guide tube 31 being supported, as at 33, on the leg of a bracket element 34, which latter, as shown in Figure 1, is secured under the cowl of the vehicle body and has the controlling and operating lever 35 of the emergency brake pivotally mounted thereon, as at 36.

The emergency brake lever 35 is obviously provided with a conventional latching device (not shown in detail) having the usual depressible handle member, as shown conventionally at 37, to effect its release from the conventional toothed sector 38 on the bracket element 34 in the manipulation of the lever, the latching device, of course, being normally in engagement with the toothed sector 38 and thereby holding the lever in the position to which it is moved. The upper end portion of the flexible rod or wire 30 is pivotally attached to the lever 35, as at 39, by which attachment the wire 30 is obviously moved lengthwise in the guide tube 31 when the lever 35 is operated and thus effects a corresponding swing of the lever element which is mounted on the rockshaft 25 so as to simultaneously close the emergency locks when the lever 35 is actuated to release the emergency brakes and to simultaneously release the safety locks when said lever 35 is actuated to set the brakes.

From the foregoing description it is apparent that an exceedingly simple yet practical and efficient means is provided for locking the doors of the vehicle during the time the vehicle is being driven and at such times when the vehicle is brought to a standstill, except when the emergency brake is applied, which is seldom necessary but only in an occasional emergency when the vehicle is necessarily at a standstill for a considerable length of time in the course of regular operation thereof or when the vehicle is parked.

While the illustration in the drawings embodies a practical adaptation of the invention it is obvious that considerable modification may be made therein without departing from the spirit and scope of the invention as defined by the appended claims. The invention, therefore, is not limited to the specific construction and arrangement shown.

What is claimed is:

1. The herein described safety lock for the doors of automobiles and the like, comprising in combination with a pillar of the vehicle body and two companion doors correlated with the pillar and both moved against the pillar when closed, a locking element common to both doors and comprising an elongated flat bar having parallel longitudinal sides and parallel inclined end portions, said bar being pivotally mounted at its middle within the pillar and coincident with the longitudinal axis of the pillar and being of a length, whereby, when set horizontally and transversely of the pillar, its opposite end portions are protruded through and beyond openings provided therefor in the opposite sides of the pillar, but when turned to an angular opened position the element is entirely within the pillar, the doors being provided with recessed keeper portions in registration with said pillar openings and in which the end portions of the locking element are received when the doors are closed against the pillar and the locking element is set in the aforesaid horizontal position, an actuator rod pivotally attached at one end to said locking element at the side of the pivotal axis thereof, said actuator rod depending from the locking element freely within the pillar with its opposite end portion projected below the pillar, and controlling and actuating means having a lever-and-rod connection with said actuator rod, said controlling and actuating means including a flexible rod mounted for reciprocation in a guide tube and attached to the controlling and operating lever of the emergency brake mechanism of the vehicle.

2. The herein described means for simultaneously locking all of the doors of an automobile body and maintaining them locked during the time of regular driving operation of the vehicle, pivoted members mounted in the pillars of the vehicle body for simultaneously locking the front and rear doors, rods pivotally connected to the pivoted members at one side of their pivot and extending downwardly through the pillars below the body, a rock shaft pivoted on the chassis and having an arm at each end pivotally connected to the rods, a second rock shaft pivoted to the chassis, an arm carried by the second rock shaft, a rod pivotally connected to the last mentioned arm and pivotally connected at its opposite end to an arm carried by the first mentioned rock shaft, arms carried by the second mentioned rock shaft, emergency brake operating means connected to said arms, and an emergency brake lever connected to the upper end of one of the arms carried by the second rock shaft for rocking the same, whereby the pivoted members are simultaneously moved to release all of the doors.

3. The combination with an automobile body, of a pivoted locking member mounted within the pillar between the doors and adapted to simultaneously lock the front and rear doors, a rod pivotally connected to the pivoted member at one side of the pivot and extending downwardly through the pillar below the body, a rock shaft pivoted on the chassis and having an arm at one end pivotally connected to the rod, a second rock shaft pivoted to the chassis, an arm intermediately secured to the second rock shaft, a rod pivotally connected to the arm and pivotally connected at its opposite end to an arm carried by the first mentioned rock shaft, an emergency brake operating rod connected to the arm on the opposite side of the second rock shaft at a point removed from the outer end thereof, and an emergency brake connection between the emergency brake lever and the outer end of the arm beyond the emergency brake rod.

LUCY M. CASTLE.